(12) United States Patent
Mahadevaiah

(10) Patent No.: US 8,286,483 B2
(45) Date of Patent: Oct. 16, 2012

(54) MULTIPHASE-LIQUID LEVEL DATA LOGGER

(76) Inventor: Basavaraj Mahadevaiah, Alpharetta, GA (US)

( * ) Notice: Subject to any disclaimer, the term of this patent is extended or adjusted under 35 U.S.C. 154(b) by 244 days.

(21) Appl. No.: 12/779,404

(22) Filed: May 13, 2010

(65) Prior Publication Data

US 2010/0218601 A1 Sep. 2, 2010

Related U.S. Application Data

(62) Division of application No. 11/689,925, filed on Mar. 22, 2007, now Pat. No. 7,730,779.

(60) Provisional application No. 60/743,673, filed on Mar. 22, 2006.

(51) Int. Cl.
*G01F 23/00* (2006.01)
(52) U.S. Cl. .................................... 73/290 R
(58) Field of Classification Search .................. None
See application file for complete search history.

(56) References Cited

U.S. PATENT DOCUMENTS 5,950,487 A * 9/1999 Maresca et al. .................. 73/319
6,928,862 B1 * 8/2005 Robbins ....................... 73/61.47

* cited by examiner

*Primary Examiner* — Peter Macchiarolo
*Assistant Examiner* — Alex Devito
(74) *Attorney, Agent, or Firm* — Bryan W. Bockhop; Bockhop & Associates, LLC

(57) ABSTRACT

A multiphase-liquid level sensing system for sensing a layer depth and thickness of a liquid of a first phase that floats on a liquid of a different second phase includes an elongated stem that defines an elongated cavity. A float, which exhibits a sensible property, is disposed coaxially around the elongated stem and has negative buoyancy relative to the liquid of the first phase and positive buoyancy relative to the liquid of the second phase. A level sensor senses the sensible property and indicates a second phase liquid distance from the float to the bottom of the stem. An overburden sensor extends downwardly from the stem senses total liquid thickness of the liquid above the overburden sensor. A computational circuit calculates a layer depth and thickness of the liquid of the first phase, based on input from the level sensor and the overburden sensor.

6 Claims, 3 Drawing Sheets

MULTIPHASE-LIQUID LEVEL DATA LOGGER

CROSS-REFERENCE TO RELATED APPLICATION(S)

This application is a divisional application of U.S. patent application Ser. No. 11/689,925, filed Mar. 22, 2007, which was a non-provisional application of U.S. Provisional Patent Application Ser. No. 60/743,673, filed Mar. 22, 2006, each of which this application claims the benefit of and the entirety of each of which is hereby incorporated herein by reference.

BACKGROUND OF THE INVENTION

1. Field of the Invention

The present invention relates to sensor systems and, more specifically, to a sensor system that senses the thickness of layers of liquids of different phases.

2. Description of the Prior Art

It is important to measure multiphase fluid levels in a variety of settings such as containers, drums, tanks, wells, rivers, oceans, and other surface and subsurface environments. Multiphase fluids are composed of liquids of different specific gravities such as light non-aqueous phase liquid (LNAPL), water, dense non-aqueous phase liquid (DNAPL), and emulsions. LNAPL is characterized by having a specific gravity less than that of water and DNAPL is characterized by having a specific gravity greater than that of water.

Current systems for measuring multiphase fluid levels include systems that use pressure transducers, optical sensors, float switches, ultrasonic sensors, magneto-restrictive, magneto-elastic, radar (pulse burst, guided-wave, frequency modulated continuous wave, and other radar-based technologies), radio frequency (RF), and related devices which are capable of measuring the level of a single phase liquid.

None of these devices are capable of measuring levels of several multiphase liquids simultaneously. Although two or more devices can be applied to measure the levels of multiphase liquids separately, none of the devices are capable of automatically computing and reporting the thicknesses of multiphase liquids or the elevations of multiphase liquids, simultaneously.

The space available to install multiple devices to measure multiphase liquids may be restricted by the narrow spaces of the container being measured. For example, a tank may not have a sufficient number of ports to accommodate more than one device, or a single available port might not be large enough to accommodate multiple devices. In measuring multiphase liquid levels in a well, the space within the well is generally too restricted to accommodate several different devices at the same time. Furthermore, it may not be possible to deploy other down-hole devices such as pumping systems or other recovery apparatus in small diameter wells.

Therefore, there is a need for a system that can sense the levels of different liquid phases simultaneously.

SUMMARY OF THE INVENTION

The disadvantages of the prior art are overcome by the present invention which, in one aspect, is a multiphase-liquid level sensing system for sensing a layer depth and thickness of a liquid of a first phase that floats on a liquid of a different second phase. An elongated stem has a top end and an opposite bottom end, a top retainer disposed adjacent the top end and a bottom retainer disposed adjacent the bottom end. The elongated stem defines an elongated cavity therein. A first float is disposed coaxially around the elongated stem. A portion of the first float exhibits a sensible property. The first float has a negative buoyancy relative to the liquid of the first phase and a positive buoyancy relative to the liquid of the second phase. A level sensor is disposed within the cavity defined by the elongated stem. The level sensor senses the sensible property of the portion of the first float. The level sensor is configured to indicate a second phase liquid distance from the first float to the bottom end of the stem based on where the sensible property is sensed on the level sensor. An overburden sensor extends downwardly from the bottom end of the stem. The overburden sensor is configured to sense a property indicative of a total liquid thickness of the liquid of the first phase and the liquid of the second phase above the overburden sensor. A depth indicator indicates a depth of the overburden sensor relative to a predetermined point. A computational circuit calculates a layer depth and thickness of the liquid of the first phase, based on a first signal from the level sensor, a second signal from the overburden sensor and the depth of the overburden sensor.

In another aspect, the invention is a multiphase-liquid level sensing system for sensing a layer depth and thickness of a liquid of a first phase that floats on a liquid of a different second phase. An elongated stem has a top end and an opposite bottom end, a top retainer disposed adjacent the top end and a bottom end disposed adjacent the bottom end. The elongated stem defines an elongated cavity therein. A first float is disposed coaxially around the elongated stem. The first float includes an annular floatation member having a top end and an opposite bottom end and a magnet that is affixed to the annular floatation member. The magnet is configured to generate a sensible magnetic field. The first float has a negative buoyancy relative to the liquid of the first phase and a positive buoyancy relative to the liquid of the second phase. A plurality of spaced-apart reed switches is disposed within the cavity defined by the elongated stem the level sensor. Each reed switch is capable of switching from a first state to a different second state when subjected to a magnetic field so as to indicate a position of the second float, thereby indicating a second phase liquid distance from the first float to the bottom end of the stem. A pressure transducer extends downwardly from the bottom end of the stem. The pressure transducer is configured to sense a pressure indicative of a total liquid thickness of the liquid of the first phase and the liquid of the second phase above the pressure transducer. A depth indicator indicates a depth of the pressure transducer relative to a predetermined point. A computational circuit calculates a layer depth and thickness of the liquid of the first phase. The computational circuit is responsive to a first signal from the level sensor, a second signal from the pressure transducer and the depth of the pressure transducer.

In yet another aspect, the invention is a method of determining a thickness and a depth of a layer of a liquid of a first phase that is floating on a layer of a liquid of a different second phase, in which a first depth of a portion of a sensor that is placed in the liquid of the second phase is detected. A total liquid thickness between the sensor and the top of the layer of liquid of the first phase is detected. A first distance from the portion of the sensor to an interface between the liquid of the first phase and the liquid of the second phase is detected. The thickness of the layer of the liquid of the first phase is calculated by subtracting the first distance from the total liquid thickness.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
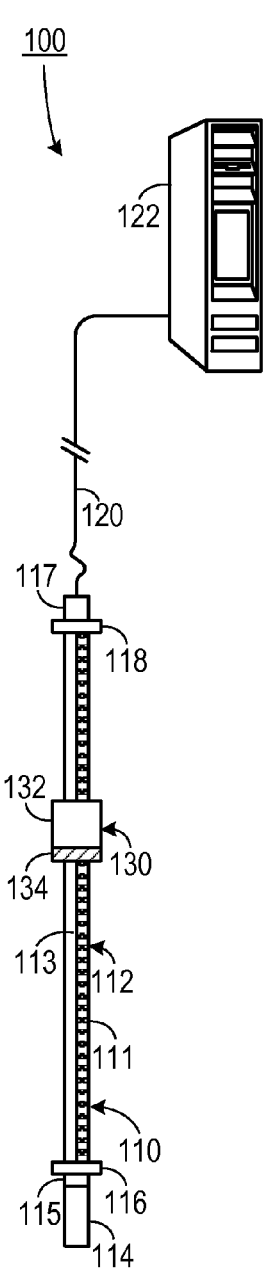
FIG. 1A is a schematic diagram of a multiphase-liquid level sensing system.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "phase" refers to the relationship of one liquid to another liquid based on their respective specific gravities.

As shown in FIG. 1, one embodiment includes a multiphase-liquid level sensing system 100 for sensing a layer depth and thickness of a liquid of a first phase that floats on a liquid of a different second phase. The sensing system 100 includes a sensor unit 110 that is remotely coupled to an electronics enclosure 122 (such as a digital computer or an analog computing system) via a communications channel 120 (which, in one embodiment, includes a shielded composite electrical cable). The sensor unit 110 includes an elongated composite stem 112 that has a top end 117 and an opposite bottom end 115. A top retainer 118 is disposed adjacent the top end 117 and a bottom retainer 116 disposed adjacent the bottom end 115. The elongated stem 112 defines an elongated cavity 113 into which is placed a level sensor 111, such as a sequence of spaced apart reed switches. Magnetorestrictive, other magnetic field dependant technologies and other non-magnetic technologies can be used as an alternative to reed-switches.

A first float 130 is disposed coaxially around the elongated stem 112. The float includes an annular flotation member 132 that has a top end and an opposite bottom end. Affixed to either the top end or the bottom end is an element 134 that exhibits a property that is sensible by the level sensor 111. For example the element 134 could be a magnet that generates a magnetic field. When the level sensor 111 includes a series of reed switches, the magnetic field would cause the reed switch closest to the magnet to close while all of the other reed switches would remain open (or vise versa). Since the position of each of the reed switches is know, changing the state of the reed switch that is in the state that indicates juxtaposition with the magnet would indicate the level of the float 130 relative to the elongated stem 112. The floatation member 132 and the element 134 together cause the float 130 to have a buoyancy that would cause it to float at an interface of two different liquids. For example, if the float 130 had a negative buoyancy relative to a liquid of a first phase and a positive buoyancy relative to a liquid of a second phase, then the float 130 would float at the interface between the two liquids, and the position of the float 130 would indicate the level of the interface.

When the float 130 is used in conjunction with reed-switch based technology, a series of multi-tiered sequential reed switches may be positioned within the hermitically sealed transmitter housed in the non-magnetic composite stem 112. The switches are connected via a shielded composite cable 120 to the electronics enclosure 122. A regulated direct current (DC) is applied to a voltage divider which extends the full length of the transmitter. As the float 130 with a magnetic sleeve 134 moves up and down, the corresponding switches are magnetically actuated to open or close in sequence thus tapping off the next higher or lower voltage. It is therefore possible to locate continually the position of the float 130 by measuring the voltage which is transmitted to the electronics enclosure 122.

The composite stem houses both a sealed transmitter composed of a series of reed switches used for measuring the position of the float as well as a set of wires in a shielded composite cable that convey the pressure readings from the transducer. A shield will separate any noise between the transducer and the reed switches.

An overburden sensor 114 extends downwardly from the bottom end 115 of the stem 112. The overburden sensor 114 could be, for example, a pressure transducer and is capable of sense a property that indicates a total liquid thickness of liquid above the overburden sensor 114. For example, if the overburden sensor 114 is a pressure transducer, then the pressure it senses would be directly proportional to the amount of liquid above the pressure transducer. One example of a suitable pressure transducer is a submersible pressure transducer, Model No. PXD. 261, available from Insitu Inc. 221 East Lincoln Avenue, Ft. Collins, CO 80524.

The electronics enclosure 122, which includes a computational circuit (such as a digital computer or an analog computer), calculates the layer thickness of the liquid above the float 130 based on a signal from the level sensor 111 and the overburden sensor 114.

A depth indicator can indicate a depth of the overburden sensor relative to a predetermined point. The depth indicator could simply be a device that measures the length of the cable 120 that has been played out in lowering the sensor unit 110. With a knowledge of the depth of the sensor unit 110, the sensing system 100 can determine both the layer depth and layer thickness of the liquid above the float 130.

Figure 1B:
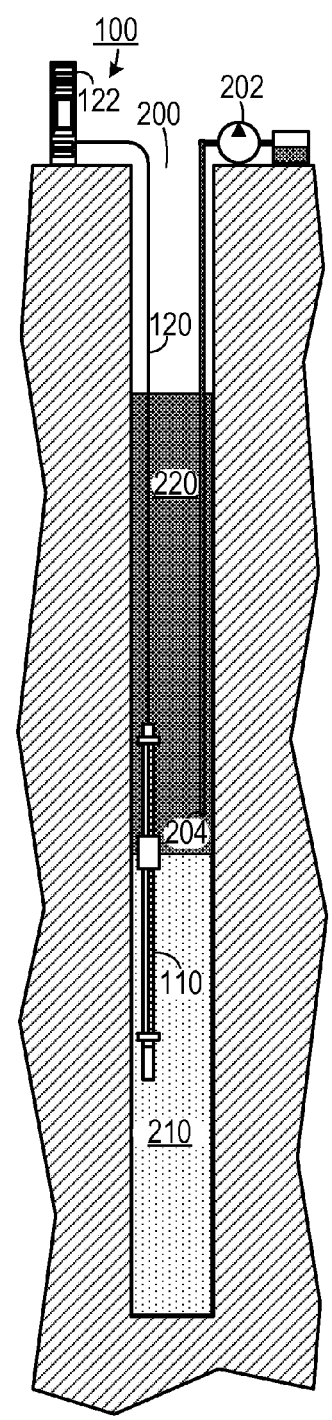
FIG. 1B is a schematic diagram of a multiphase-liquid level sensing system employed to measure levels in a well.

The sensing system 100 can be used to detect layer depths of different liquid phases in such things as tanks, sumps, wells, reservoirs, lakes, rivers and many other things that store liquids of more than one liquid phase together. For example, as shown in FIG. 1B, the sensing system 100 may be used to detect the layer depth and thickness of a LNAPL layer 220 (such as an oil layer) that is floating on a water layer 210 in a well 200. The sensing system 100 can be used in concert with a pump 202 to insure that the pump intake 204 does not extend into the water layer 210. The sensing system 100 allows real-time monitoring of LNAPL layer 220 depth as the LNAPL is being pumped out. Since the water layer 210 level may rise as the LNAPL is being pumped out due to the removal of the overburdening weight of the LNAPL, the sensing system 100 can prevent over pumping of the well 200. This can be especially important because if the water layer 210 extends into the pores from which LNAPL flows into the well 200, the water can block the pores, thereby reducing the capacity of the well.

Figure 1C:
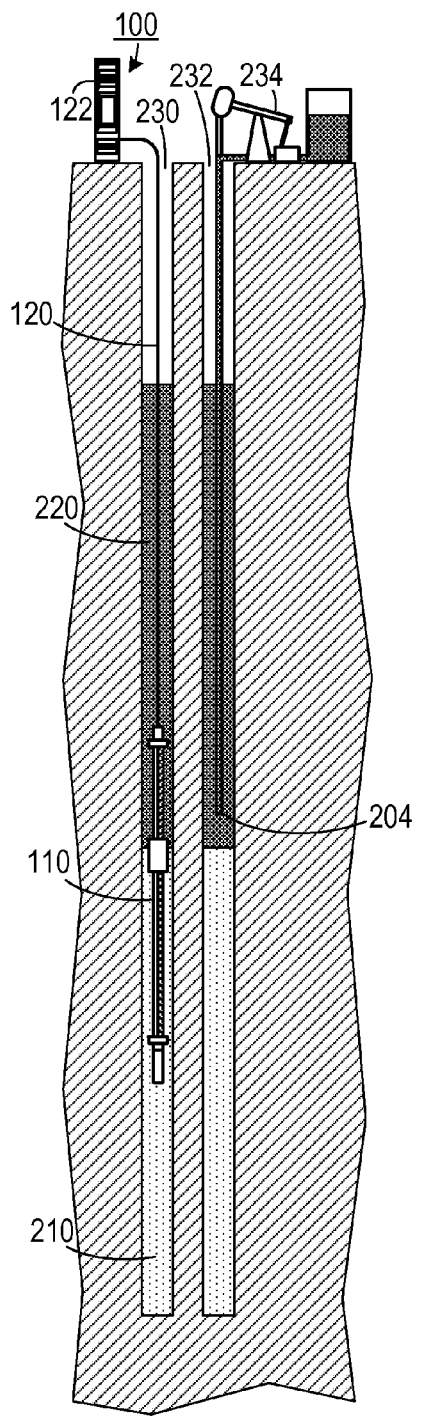
FIG. 1C is a schematic diagram of a multiphase-liquid level sensing system used to measure levels in a well that is adjacent to another well.

As shown in FIG. 1C, certain pumping systems 234 do not accommodate placement of the sensing system 100 in the same well 232 that is being pumped. However, the sensing system 100 can still monitor the layer thickness and depth in the well 232 by being placed in an adjacent well 230.

Figure 2:
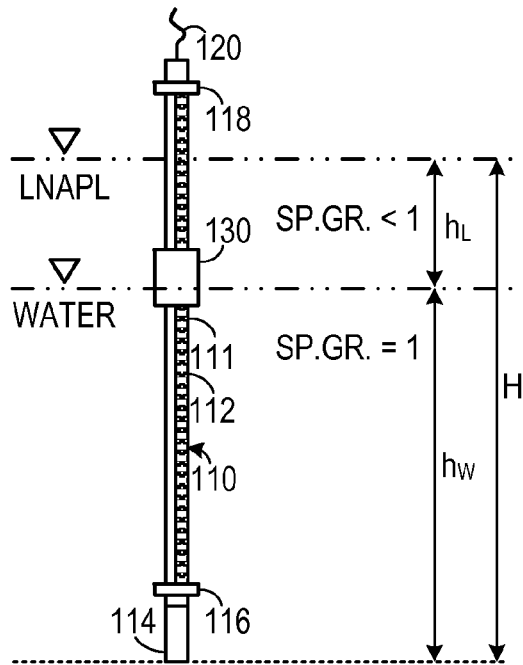
FIG. 2 is a schematic diagram of a one float multiphase-liquid level sensing system for sensing a LNAPL and water layer thicknesses.

Calculation of the layer thicknesses is demonstrated as follows, with referenced to FIG. 2. At predetermined intervals, the transducer 114 measures the differential pressure ("PA") (apparent pressure) exerted by the fluids 210 and 220 present above the transducer 114. This data is used to compute the apparent height ("HA") of the fluids 210 and 220. Since the transducer is unable to distinguish between the multi-phase liquids present above the transducer, the true height of the multiphase fluid "H" must be determined by further computations.

The data from the level sensor 111 and the transducer 114 is further processed to calculate elevations and thicknesses of multiphase liquids. The distance between the float switch and the transducer establishes the true height "$h_W$" of water above the transducer 114. The LNAPL layer height ("$h_L$") above the water layer is calculated as follows: First, the pressure exerted by the water (PW) above the transducer is deducted from $h_W$ as follows. Given that pressure of 1 psi=2.307 feet of water, PW=$h_W$/2.307. The additional pressure exerted by the LNAPL (PL) is PL=PA−PW. Then, the thickness of LNAPL layer 220 floating on the water surface is $h_L$=PL*2.307*SGL, where SGL=specific gravity of the LNAPL. (This can be determined by sampling the LNAPL and determining its specific gravity using well know methods.) Then, the true height of the multiphase liquid above the transducer, H=$h_L$+$h_W$. The height "H" can be referenced to the transducer elevation, an arbitrary elevation, or an elevation referenced to mean sea level (MSL), or any other reference elevations to compute the true datum of the liquid level measured by the transducer.

Figure 3:
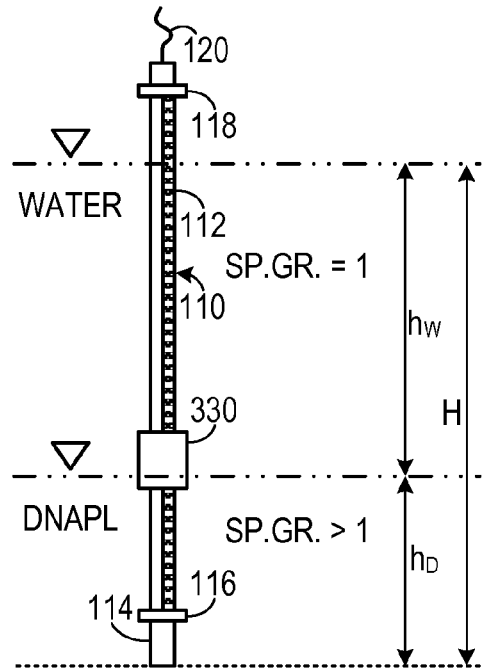
FIG. 3 is a schematic diagram of a one float multiphase-liquid level sensing system for sensing a DNAPL and water layer thicknesses.

In certain embodiments, the sensing system 100 may be used to measure the thickness of a water layer above a DNAPL layer. In such an embodiment, as shown in FIG. 3, a float 330 that is negatively buoyant in water and positively buoyant in DNAPL is used.

The distance between the float switch and the transducer establishes the true height "$h_D$" of DNAPL above the transducer. The height "$h_W$" of the water above the water-DNAPL interface is calculated as follows: First, pressure at 1 psi=2.307 feet of water and, therefore, PW=hW/2.307. The pressure exerted by the DNAPL layer is first computed according to the following formula: PD=SGD×($h_D$/2.307), where SGD=Specific gravity of the DNAPL. The additional pressure exerted by the water above the water-DNAPL interface is computed as follows: PW=PA−PD. The thickness of water above the water-DNAPL interface is computed as follows: $h_W$=PW*2.307. The true height of the multiphase liquid above the transducer, H=$h_L$+$h_W$. As mentioned above, the height "H" can be referenced to the transducer elevation, an arbitrary elevation, or an elevation referenced to mean sea level (MSL), or any other reference elevations to compute the true datum of the liquid level measured by the transducer.

Figure 4:
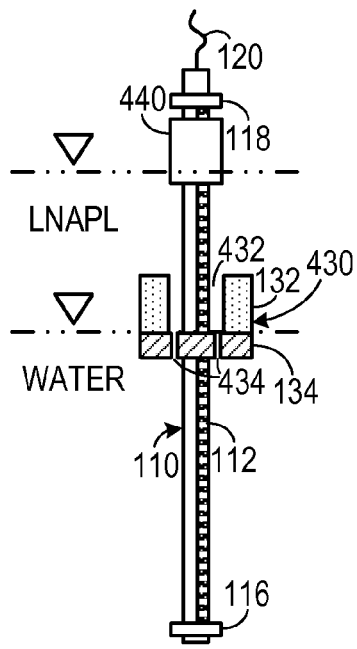
FIG. 4 is a schematic diagram of a two float multiphase-liquid level sensing system.

As shown in FIG. 4, a second float 430 may be employed to enable the system to measure relatively thin layers with a high level of precision. This system employs a first float 430 and a second float 440. The first float 430 can be cup-shaped and define an open portion 432 that is complementary in shape to the second float 440. The first float 430 defines at least one passage 434 passing downwardly therethrough so as to allow liquid to drain out of the open portion 432. Thus, as the LNAPL layer thins, the second float 440 can fit into the open portion 432 so as to give a precise indication of the thickness of the LNAPL layer. The passage 434 (or passages) may be embodied with perforations or as a screen. Also, the passage 434 can be either on the bottom as shown, or extending radially from the side of the float 430. The passage 434 allows the second float 440 to seat into the first float 430 without entrapping liquid within the open portion 432.

Figure 5:
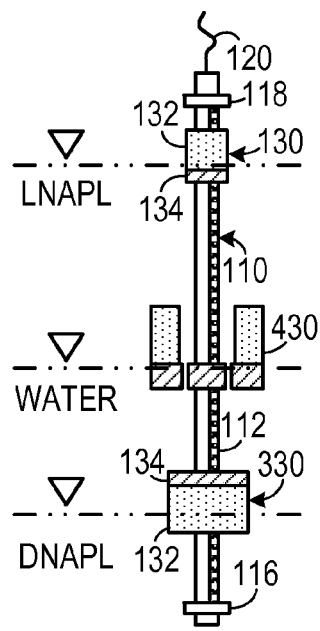
FIG. 5 is a schematic diagram of a three float multiphase-liquid level sensing system.

A three float embodiment, as shown in FIG. 5, allows precise measurement of the thickness of two layers in a multi-layer environment (for example one in which a water layer is above a DNAPL layer and a LNAPL layer is above the water layer). This embodiment adds a third float 330 having a buoyancy that is negative in water and positive in DNAPL. Addition of a transducer (not shown) at the bottom of the stem 112 would allow the layer thickness monitoring of an additional layer above the LNAPL layer.

Figure 6B:
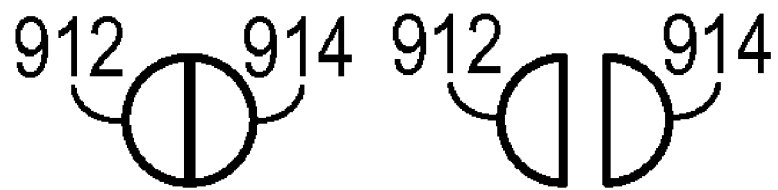
FIGS. 6A and 6B are schematic diagrams of a split stem.
Figure 6A:
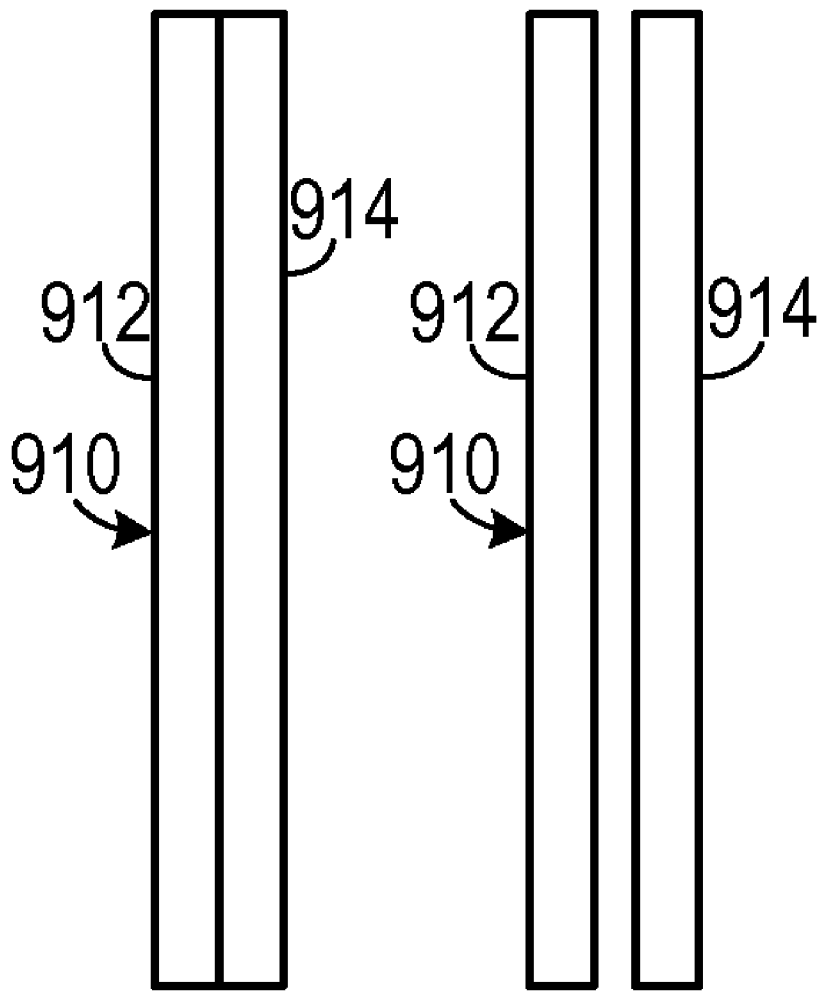

The range of measurement for all of the versions discussed above can be extended by adding additional lengths of stem. As shown in FIGS. 6A and 6B, the stem 112 can be lengthened as much as desired with a split stem adapter 900, which includes a first section 912 and a complimentary second section 914. Standard temperature, barometric correction, and clock functions can be added to the stem adapter 900 as needed. Apart from traditional line power, the system 100 can be powered by various sources of electricity. Also, a small battery power supply (not shown) can be integrated into the stem 112 to store data for retrieval at a later time. Direct-read cable can be utilized to transmit real time data to a remote receiver or wirelessly transmitted to a remote receiver. The stem 112 can be composed of either solid or flex pipe.

Since numerous configurations with different sensing devices are possible, many different mechanical constructions and arrangements of the apparatus are possible. The system may be provided with a protective sleeve to prevent entanglement with other devices that may be deployed adjacent to the device. The system provides continuous real time observations of the liquid levels and the thicknesses at predetermined intervals.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of determining a thickness and a depth of a layer of a liquid of a first phase that is floating on a layer of a liquid of a different second phase,
   comprising the actions of:
   a. detecting a first depth of a portion of a pressure sensor that is placed in the liquid of the second phase by measuring a length of cable, connected to and supporting the sensor, played out until the sensor reaches the first depth;
   b. sensing an apparent pressure sensed by the pressure sensor at the first depth;
   c. detecting a first distance from the portion of the sensor to an interface between the liquid of the first phase and the liquid of the second phase; and d. calculating the thickness of the layer of the liquid of the first phase that is equal to (the apparent pressure minus a specific gravity of the liquid of the second phase times the first distance times a pressure increase per unit depth of the liquid of the first phase) divided by a pressure increase per unit depth of the liquid of the first phase.

2. The method of claim 1, wherein the action of detecting a first distance from the portion of the sensor to an interface between the liquid of the first phase and the liquid of the second phase comprises the actions of:
   a. placing at the interface a float that is buoyant in the liquid of the second phase and that is not buoyant in the liquid of the first phase; and
   b. detecting a position of the float.

3. The method of claim 2, wherein the method of detecting a position of the float comprises the action of disposing the float about a stem that includes a plurality of float sensors along a portion of the length of the stem, wherein the each of the plurality of float sensors is configured to sense when the float is adjacent thereto.

4. The method of claim 3, wherein the float sensors comprise reed switches.

5. The method of claim 4, wherein the reed switches are magnetic reed switches and wherein a portion of the float is magnetized.

6. The method of claim 1, wherein the action of detecting a first depth of a portion of a sensor that is placed in the liquid of the second phase comprises measuring a length of a cable supporting the sensor between the sensor and a surface.

* * * * *